W. C. MARSHALL.
Apparatus for Treating and Drying Animal Matter.

No. 137,699.　　　　　　　　　　　Patented April 8, 1873.

UNITED STATES PATENT OFFICE.

WILLIAM C. MARSHALL, OF NEW YORK, N. Y.

IMPROVEMENT IN APPARATUS FOR TREATING AND DRYING ANIMAL MATTER.

Specification forming part of Letters Patent No. 137,699, dated April 8, 1873; application filed January 21, 1873.

*To all whom it may concern:*

Be it known that I, WILLIAM C. MARSHALL, of the city, county, and State of New York, have invented a new and useful Improvement in Treating Lard; and I do hereby declare the following to be a full, clear, and exact description thereof, which will enable those skilled in the art to make and use the same, reference being had to the accompanying drawing forming part of this specification, in which drawing—

Figure 1:
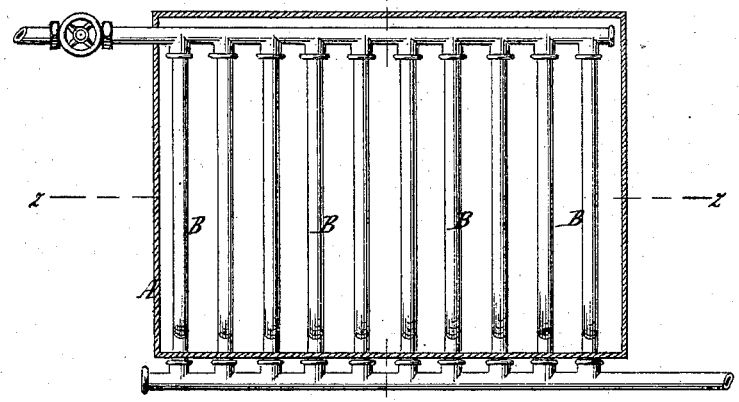
Figure 2:
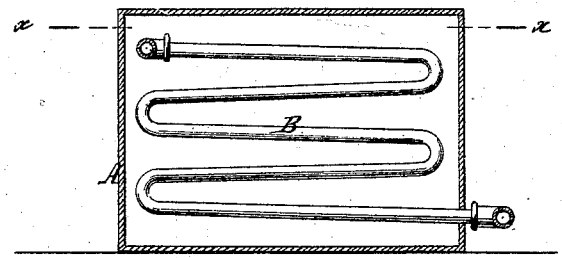
Figure 3:
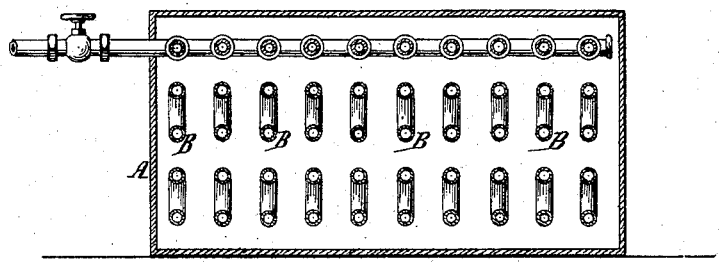

Figure 1 represents a horizontal section of the apparatus which I use in carrying out my invention in the plane $x\ x$, Fig. 2. Fig. 2 is a transverse vertical section of the same in the plane $y\ y$, Fig. 1. Fig. 3 is a longitudinal vertical section of the same in the plane $z\ z$, Fig. 1.

Similar letters indicate corresponding parts.

My invention consists in exposing scrap of lard, as received from the press, to the action of steam-coils placed side by side, at suitable distances apart, in a chamber, which can be closed in such a manner that, by spreading the scrap on the surface of the coils and closing the chamber, the scrap gradually dries and drops down between the coils, whence it is finally removed in a perfectly dry state ready to be handled and to be packed for the market.

In the drawing, the letter A designates a chamber made of sheet metal, or of wood lined with sheet metal, and provided with a cover, by means of which it can be firmly closed. In this chamber are placed a series of steam-coils, B, which are set at uniform distances apart, as shown in the drawing, the distance between each pair of coils being about five inches. Said coils are supplied with steam from a boiler by one or more pipes, as may be desirable, and they may be connected with each other or each may have a separate connection with the steam-pipe or steam-boiler. The scrap of lard, as the same is received from the press, is shoveled on the surface of the steam-coils, and, as the same begins to dry, it drops down between the coils, when more scrap may be introduced until the chamber is filled. By closing the chamber the scrap is exposed to the full heat radiating from the steam-coils, and it dries rapidly to such a degree that the same, on being removed from the chamber, can be conveniently handled and packed up ready for the market. The scrap thus prepared is particularly useful as a fertilizer.

What I claim as new, and desire to secure by Letters Patent, is—

1. The within-described process of treating scrap of lard obtained from lard-presses by exposing the same to the heat of steam-coils arranged in a closed chamber, substantially in the manner herein set forth.

2. The arrangement of a series of steam-coils, B, at suitable distances apart, in a closed chamber, A, substantially in the manner and for the purpose herein shown and described.

W. C. MARSHALL.

Witnesses:
W. HAUFF,
E. G. KASTENHUBER.